UNITED STATES PATENT OFFICE.

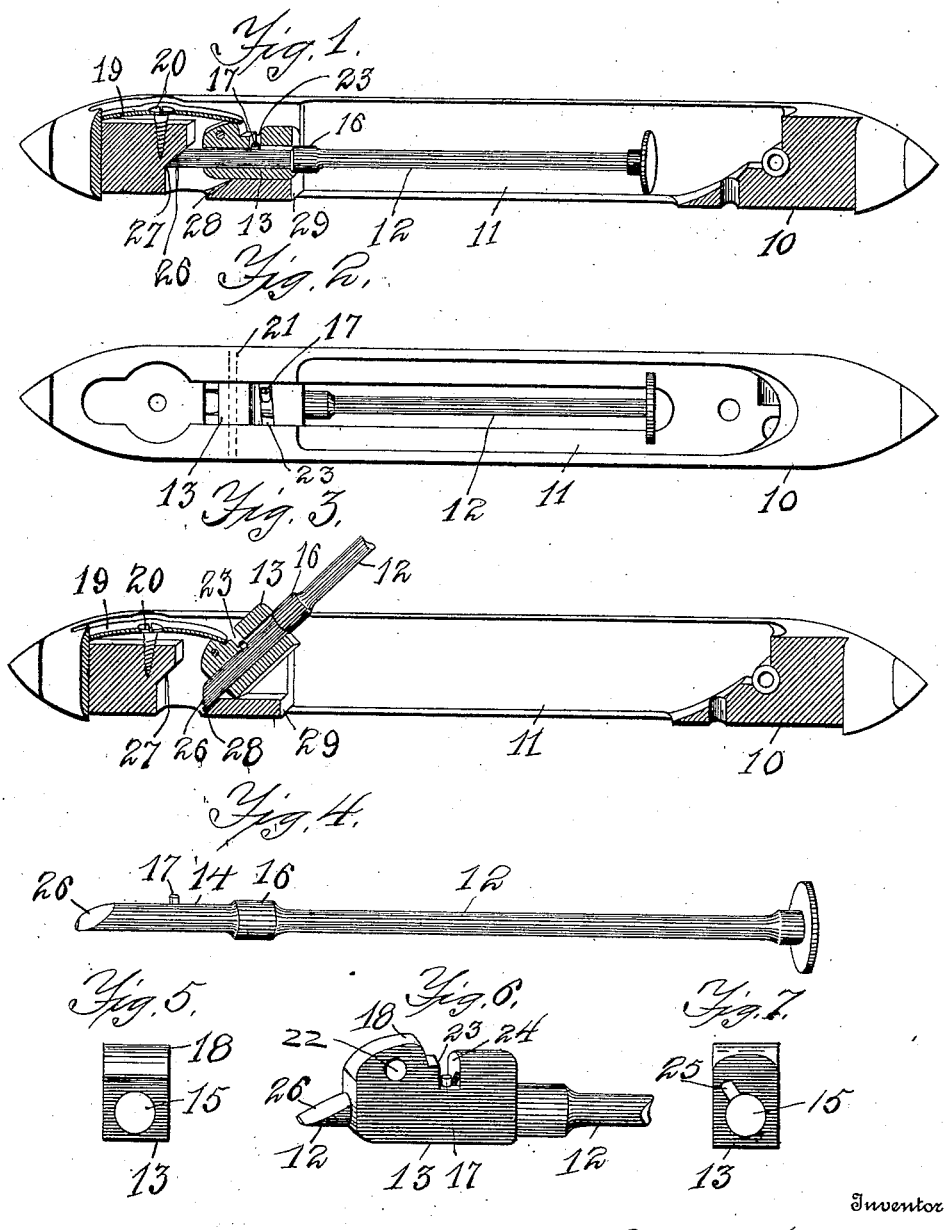

JOHN VARLEY, OF JAMESTOWN, NEW YORK.

LOOM-SHUTTLE.

No. 879,427.  Specification of Letters Patent.  Patented Feb. 18, 1908.

Application filed August 22, 1907. Serial No. 389,615.

*To all whom it may concern:*

Be it known that I, JOHN VARLEY, a citizen of the United States, residing at Jamestown, and county of Chautauqua, and State of New York, have invented new and useful Improvements in Loom-Shuttles, of which the following, taken in connection with the accompanying drawings, is a full, clear, and exact description.
The invention relates to loom shuttles for weaving textile and other fabrics, and is an improvement upon my former construction, as shown in Letters Patent, Number 861,335, bearing date July 30, 1907.
The object of the present improvement is to provide a locking means for the spindle in the spindle head, whereby the spindle is more firmly held and more quickly and easily adjusted than in my former construction.
In the drawings, Figure 1 is a lengthwise sectional view of the main working portions of the shuttle with the spindle in the lowered or normal working position, Fig. 2 is a plan view of the shuttle with the tension spring removed, Fig. 3 is a lengthwise sectional view of the working parts of the shuttle with the spindle in the raised position. Fig. 4 is a side elevation of the spindle without the spindle head. Fig. 5 is an elevation of the rear end of the spindle head showing the hole without the bayonet slot. Fig. 6 is a side elevation of the improved spindle head with the butt of the spindle therein and showing the crosswise locking slot. Fig. 7 is an elevation of the front end of the spindle head showing the bayonet slot for the locking pin on the butt of the spindle.

Similar numerals refer to corresponding parts in the several views.
The numeral 10 indicates the shuttle body which is of the ordinary wood type with metal tipped pointed ends and a lengthwise body slot 11, within which the spindle is mounted.

The spindle shown in the present construction is of the socket spindle type and consists of two separable parts, the body 12 (which enters the bobbin) and the socket or head 13, which receives the end 14 of the body 12 in a lengthwise hole or opening 15 therein. The spindle body 12 has an enlargement 16 which sets against the end of spindle head 13 around hole 15. Spindle end 14 also has a pin or locking projection 17 in the side of the spindle about midway of the length of end 14, and at a spaced distance from enlargement 16.

My improved spindle head 13 is formed with a projection 18 near the rear end on its upper side over which a tension spring 19 works, which spring is held in place on the shuttle body by shuttle screw 20. The head 13 is held in the raised or lowered position by tension spring 19 as it presses against projection 18, or passes over the front of said projection and causes the spindle to snap to place in the usual manner, the spindle head 13 being pivotally mounted in one end of lengthwise slot 11 by means of a crosswise pin 21 which extends through hole 22 in projection 18 or near the rear end of the spindle head so as to give to it the right elevation when in a raised position.

The improvement in the spindle head 13 consists of a crosswise slot 23 about midway of the upper side of the spindle head. A slot 25 usually termed a bayonet slot, is provided lengthwise of hole 15 for pin 17 and extends in head 13 only to slot 23. The wall 24 of slot 23 is given a locking bevel by being cut on an incline, so that pin 17 may be locked thereon by turning the spindle body from bayonet slot 25 to the right; thus the weaver must invariably turn the spindle body 12 to the right to lock it and to the left to unlock it. The entire slot 23 might be cut at the locking angle. It is apparent that the end 14 of the spindle body 12 is firmly supported each side of pin 17 in hole 15 within head 13 and that the walls of slot 23 serve as a support for pin 17 so that the pin cannot be broken off or turned to one side, thereby allowing the spindle body to become loose in the spindle head and consequently locking the spindle body in the spindle head much more firmly and in a more durable manner than in my former construction.

The spindle head 13 is pivotally mounted in shuttle body 10 on pin 21 at the exact point which will balance the spindle and head. The upper side 26 of the rear end 14 of spindle body 12 is beveled and a corresponding incline 27 is provided on shuttle body 10 against which the bevel end 26 strikes when the spindle is returned to its normal working position, with the spindle body 12 turned to its locked position in head 13. The lower side of said rear end is left straight and a portion 28 of the shuttle body 10 is provided at the angle of elevation desired for the raised position for the spindle, as shown in Fig. 3. Inclines 27 and 28 limit the movement of the spindle. Incline 28 is provided on a closure 29 of slot 11 of the shuttle body beneath spindle head 13 and against which the lower side of spindle head 13 strikes when the spindle is returned to the normal working position.

It is now apparent that when, in the normal working position, the spindle head 13 will be firmly held between the side walls of the slot 11 as held in place by the pin 21, and that the lower side of the spindle head will rest firmly upon closure 29 of the shuttle body. The spindle body 12 will be firmly held in its locked position in spindle head 13, and rear end 26 will be firmly pressed against incline 27, and the spindle head will be firmly held to place by the stiff tension spring 19 pressing against the inclined rear end of said spindle head.

I claim as new:—

1. The combination of a shuttle body, a spindle pivoted therein, said spindle composed of a spindle body and spindle head, said head having a hole and bayonet slot therein to receive the end of said spindle body, said head having a crosswise slot intersecting said hole, and a projection on said spindle body to lock in said crosswise slot.

2. The combination of a shuttle body, a spindle pivoted therein, said spindle composed of a spindle body and spindle head, said head having a hole therein to receive the end of said spindle body, said head having a crosswise slot intersecting said hole, said head having a bayonet slot in said hole extending to said intersecting crosswise slot, and a spaced locking projection on said spindle body to lock with a turn on said intersecting slot.

3. The combination of a shuttle body 10 having a lengthwise slot 11 therein, a spindle composed of a spindle body 12 and head 13 pivotally mounted on a pin 21 in said slot, a projection 18 on said head, a tension spring 19 to engage said projection and hold said head, said head having a crosswise slot 23 with an angular wall 24, said head having a hole 15 and a bayonet slot 25 extending to said crosswise slot, an enlargement 16 on said spindle body and a pin 17 at a spaced distance therefrom to lock on said angular wall in said crosswise slot, and spaced inclines 27 and 28 on said shuttle body to limit the movement of said spindle body, substantially as and for the purpose specified.

In testimony whereof I have signed my name to this specification in the presence of two subscribing witnesses.

JOHN VARLEY.

Witnesses:
A. L. FURLOW,
E. L. POWELL.